United States Patent [19]

Lesquir

[11] Patent Number: 4,884,365
[45] Date of Patent: Dec. 5, 1989

[54] DEVICE FOR COLLECTING SAP

[75] Inventor: Dominique Lesquir, Buckland, Canada

[73] Assignee: IPL Inc., Quebec, Canada

[21] Appl. No.: 329,404

[22] Filed: Mar. 27, 1989

[51] Int. Cl.$^4$ ............................................. A01G 21/10
[52] U.S. Cl. ........................................................ 47/52
[58] Field of Search ............... 47/11, 52, 53; 222/512, 222/542, 566; 217/98, 108, 110, 105, 109, 113; 220/234, 238; 403/DIG. 4

[56] References Cited

U.S. PATENT DOCUMENTS

| | | | |
|---|---|---|---|
| 2,877,601 | 3/1959 | Griggs | 47/52 |
| 3,469,344 | 9/1969 | Garvey | 47/53 |
| 4,366,648 | 1/1983 | Morin | 47/52 |
| 4,512,104 | 4/1985 | Lamb | 47/52 |

FOREIGN PATENT DOCUMENTS

| | | | |
|---|---|---|---|
| 11533 | 1/1896 | Switzerland | 217/98 |
| 321051 | 6/1957 | Switzerland | 217/98 |

Primary Examiner—David A. Scherbel
Assistant Examiner—Jerrold D. Johnson
Attorney, Agent, or Firm—Cushman, Darby & Cushman

[57] ABSTRACT

The disclosure herein describes a device for collecting sap from trees which has a sap-collecting section adapted to be inserted into the outer layers of a tree; this section displays thereon an annular recess in which is received an expansible sealing element. A second member is partially mounted over the sap-collecting section of the first member and is adapted to be moved against the sealing element so as to expand the element when the device is inserted into a tree cavity to thereby prevent air infiltration in the device when the sap-collecting system is operating under vacuum conditions.

14 Claims, 3 Drawing Sheets

DEVICE FOR COLLECTING SAP

FIELD OF THE INVENTION

The present invention pertains to a device for collecting sap from trees and for directing the sap to a sap-collecting system which is operable under vacuum conditions.

BACKGROUND OF THE INVENTION

Recent tree sap-collecting systems consist of a network of interconnected tubings allowing the sap collected from trees to be vacuum-sucked directly to a central sap-processing unit.

It has been found that, in cases where a sap-collecting device is not tightly engaged into the tree, the vacuum system also draws outside air into the system.

In applicant's Canadian co-pending application No. 561,977 filed Mar. 21, 1988, there is provided a sap-collecting device with an annular groove in the sap-collecting section thereof to provide a sealing engagement with the outer layer of the tree from which the sap is to be collected.

It has been found that, since the insertion of the section of the device which carries the sealing element, into the layers of the tree is accomplished by hitting that section, the sealing element damages the fibers of the tree.

OBJECTS AND STATEMENT OF THE INVENTION

It is an object of the present invention to provide a device which overcomes the above-described problem. This is achieved by causing the sealing element to expand after having been inserted into a tree cavity.

The present invention therefore relates to a device for collecting sap from trees and for directing the sap to a sap-collecting system operable under vacuum conditions, which comprises:

a first member having a hollow sap-collecting section and a hollow sap-discharging section wherein the sap-collecting section has an open end adapted to be inserted into a cavity formed in the outer layers of a tree to be sap-collected and displays thereon an annular recess which is located in the layers when the sap-collecting section is engaged in the tree. Expansible sealing means are secured in this recess to provide a sealing engagement with the tree layers to prevent air infiltration in the member from the open end thereof when the sap-collecting system is operating under vacuum conditions;

a second member partially surrounds the sap-collecting section of the first member and has one end disposed adjacent the sealing means; and means cooperating between the first and second members cause the second member to force the sealing means to expand to sealingly secure the device in the tree.

In one preferred form of the invention, the cooperating means consist of a lever pivotally mounted to a sap-discharging section of the first member.

In another form of the invention, the cooperating means consist of a sleeve which is threadedly engaged to the outer surface of the sap-collecting section and which, when rotated, forces the sleeve against the sealing means to expand the same.

Other objects and statement of the invention will become apparent from the detailed description given hereinafter. It should be understood, however, that this detailed description, while indicating a preferred embodiment of the invention, is given by way of illustration only, since various changes and modifications within the spirit and scope of the invention will become apparent to those skilled in the art.

DESCRIPTION OF PREFERRED EMBODIMENTS

Figure 1:
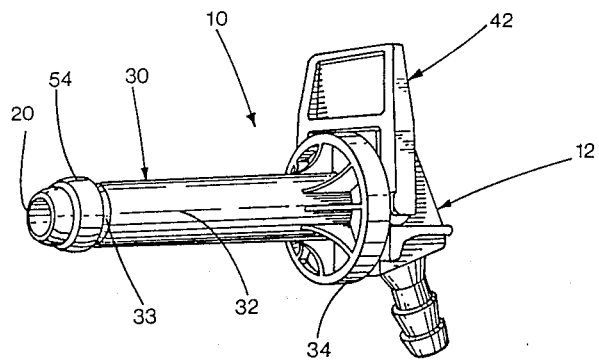
FIG. 1 is a perspective view of a device made in accordance with the present invention.

Referring to FIG. 1, there is shown a device, generally denoted 10, for collecting sap from trees and for directing the sap to a sap-collecting system (not shown) operable under vacuum conditions.

Figure 3:
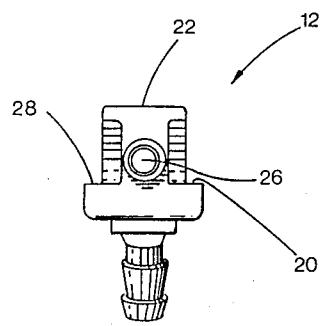
FIG. 3 is an end view as seen from the left of FIG. 2.
Figure 2:
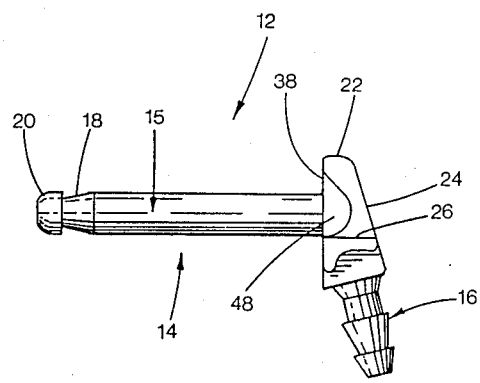
FIG. 2 is a side elevational view of the first member of the device shown in FIG. 1.

Referring to FIGS. 2 and 3, the device 10 comprises a first member, generally denoted 12, which has a sap-collecting section 14 and a sap-discharging section 16. The sap-collecting section 14 consists of a hollow elongated cylindrical portion 15 having a tapered recess 18 and a rounded extremity 20. Section 14 also comprises a head 22 having a narrow inclined central portion 24 and two opposite horizontal surfaces 26 and 28.

As shown in FIG. 1, the device of the present invention comprises a second member, generally denoted 30, that includes a cylindrical portion 32 and an annular flange portion 34 defining a circular surface 36 (see FIG. 7) which bears against the inner wall 38 of the head 22.

Figure 4:
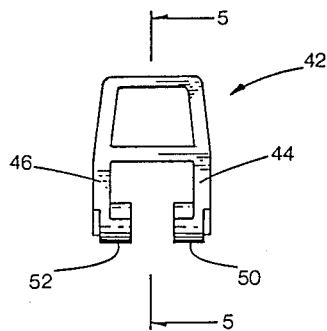
FIG. 4 is an elevational view of the actuatable lever mounted on the device shown in FIG. 1.
Figure 5:
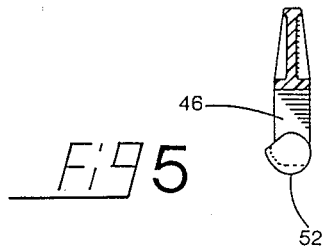
FIG. 5 is a cross-sectional view taken along lines 5—5 of FIG. 4.

Referring to FIGS. 4 and 5, the device includes a third member 42 in the form of a lever which is mounted to the head 22 of the first member 12. This lever consists of a pair of leg portions 44 and 46 which extend on either side of the central portion 24 of member 12 and which are adapted to fit into appropriate recesses 48 provided in the side walls of the central member. Each leg 44, 46 has a cam surface 50, 52 which is adapted to contact and rotate on the horizontal surfaces 26 and 28 of member 12.

Figure 8:
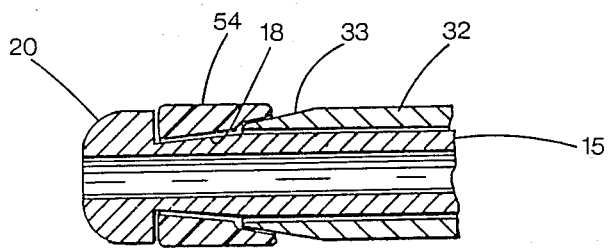
FIG. 8 is an enlarged cross-sectional view of the extremity of the sap-collecting device.

A sealing element 54, in the form of a rubber band, is fitted in recess 18 of section 15. As illustrated in FIG. 8, the bore of the sealing element 54 is shaped to configure to the corresponding shape of the recess 18.

Figure 6:
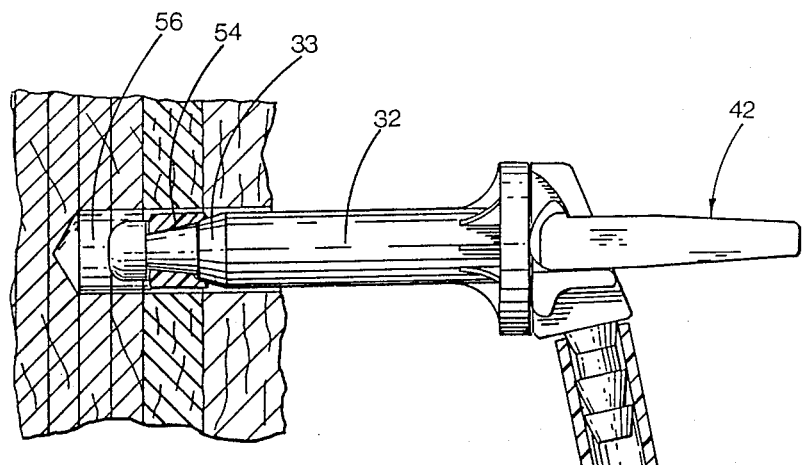
FIG. 6 is an elevational view of the device during entry in a tree.
Figure 7:
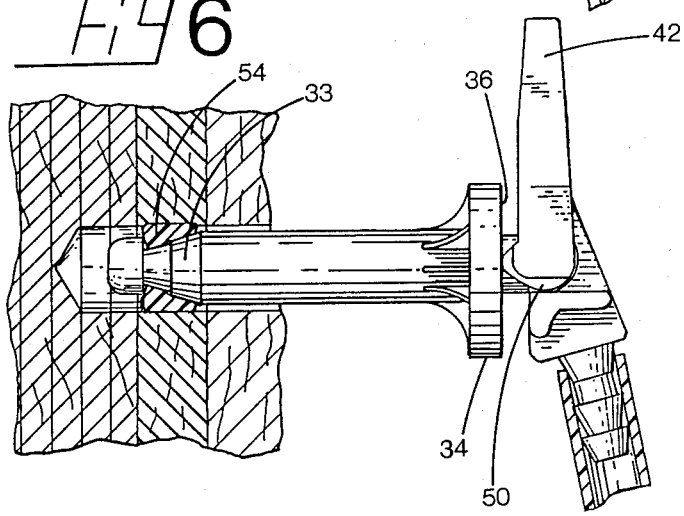
FIG. 7 is a view similar to FIG. 6 showing the sealing element in expanded condition.

After a cavity 56 has been made in the outer layers of a tree, section 15 of the member 12 is inserted into this cavity together with the sleeve 32 of the second member 30 and with the sealing element 54. In FIG. 6, lever 42 is shown in the position where the tapered extremity 33 of the sleeve 30 does not exert any pressure on the sealing element 54. However, as shown in FIG. 7, to secure the sap-collecting device in the tree cavity, the sealing element 54 is expanded by pivoting lever 42 to adopt the position shown so that the cam surfaces 50 and 52 will exert an inward pressure on the top surface 36 of the second member 30. Hence, when the sap-collecting system is working under vacuum conditions, the expanded sealing element prevents air infiltration from the outside through the tree cavity into the extremity 20 of the device.

Figure 9:
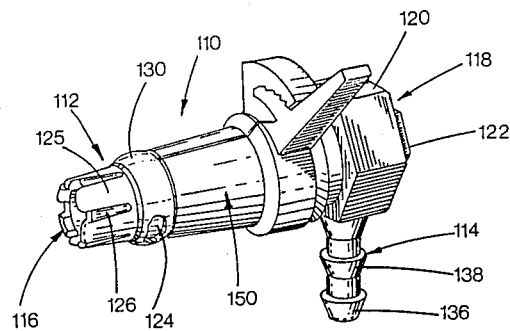
FIG. 9 is a perspective view of another embodiment of a sap-collecting device made in accordance with the present invention.

Referring to FIG. 9, there is shown a second embodiment of the present invention which is somewhat similar in construction to that described in the above-noted Canadian co-pending application to applicant.

The sap-collecting device 110 includes a hollow body 112 and a sap-discharging extension 114. The hollow body 112 comprises an open end 116 and a closed end 118. The closed end 118 defines a rigid section consisting of a large hexagonal-shaped portion 120 and a smaller hexagonal portion 122. A frusto-conical section 124 extends between the hexagonal portion 120 and the open end 116. The portion adjacent the open end 116 displays a series of longitudinal circumferentially spaced grooves 126 which terminate short of the extremity 125 of the body thereby allowing radial access inside the hollow interior of the body 112. The frusto-conical portion also includes a groove 128 in which is received an O-ring 130 made of resilient material, preferably rubber. The hollow body includes a cylindrical portion 132 on which is formed a thread 134.

Extension 114 is provided with a series of conical portions 136 and 138 allowing it to be fixedly secured to a tube 140 forming part of the sap-collecting system which collects and directs sap to a central sap-processing unit (not shown) working under vacuum conditions.

Figure 14:
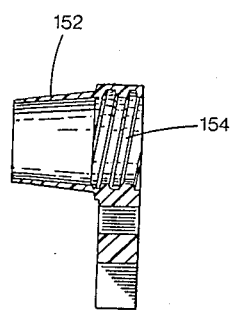
FIG. 14 is a cross-sectional view taken along line 14—14 of FIG. 13.
Figure 12:
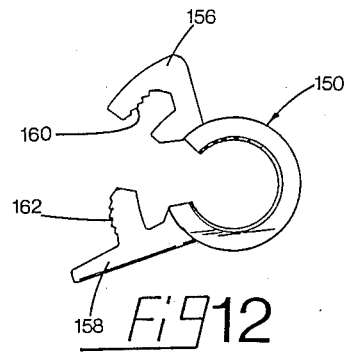
FIG. 12 is an end view of the element mounted on the sap-collecting section of the device shown in FIG. 9.
Figure 13:
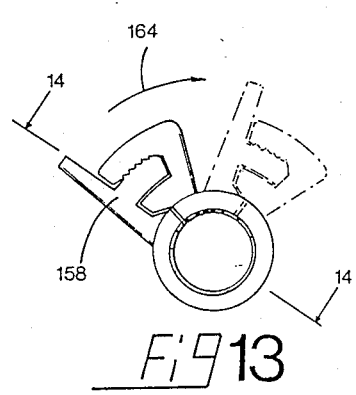
FIG. 13 is a view similar to FIG. 12 showing the element in locked condition.

As illustrated in FIGS. 12, 13 and 14, a sleeve member 150 is adapted to be mounted over the frusto-conical portion 124 of device 110. The sleeve is slit to thereby fit over the frusto-conical portion. It comprises a frusto-conical section 152 and a threaded section 154 adapted to engage the threaded portion 132 of device 110.

Also integrally mounted to the sleeve member is a locking mechanism consisting of a U-shaped extension 156 adapted to be engaged with a T-shaped extension 158, each extension having interengaging toothed portions 160 and 162.

Figure 11:
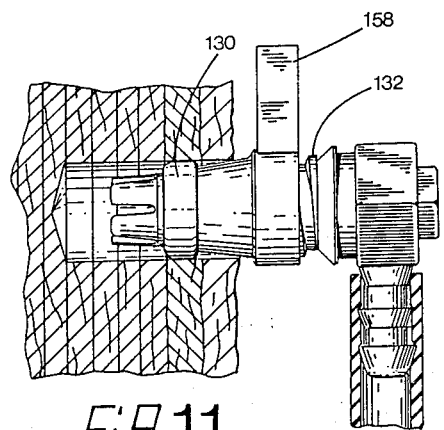
FIG. 11 is an elevational view similar to FIG. 10 showing the sealing element in expanded condition.
Figure 10:
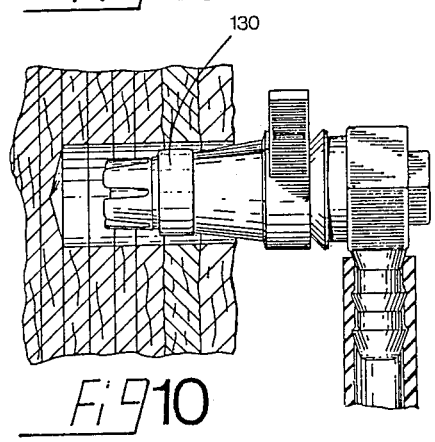
FIG. 10 is an elevational view showing the device during entry in a tree cavity.

As illustrated in FIG. 13, once extensions 156, 158 are interengaged, they may be rotated (as indicated by arrow 164) so that the sleeve member 150 in cooperation with the threaded portion 132 may move to expand the O-ring 130 from the position shown in FIG. 10 to the position shown in FIG. 11 thereby securing in a sealing manner the sap-collecting device in the tree cavity.

Although the invention has been described above in relation with one specific form, it will be evident to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A device for collecting sap from trees and for directing said sap to a sap-collecting system operable under vacuum conditions, comprising: a first member having a hollow sap-collecting section and a hollow sap-discharging section, said sap-collecting section having an open end adapted to be inserted into a cavity formed in the outer layers of a tree to be sap-collected and displaying thereon an annular recess which is disposed in said layers when said sap-collecting section is engaged in a tree; expansible sealing means secured in said recess to provide a sealing engagement with said tree layers to prevent air infiltration in said member from said open end when said sap-collecting system is operating under vacuum conditions; a second member mounted over part of said sap-collecting section and having one end disposed adjacent said sealing means; means cooperating between said first and said second members for causing said second member to force said sealing means to expand to sealingly secure said device in said tree.

2. A device as defined in claim 1, wherein said second member is a cylindrical sleeve slidably mounted over a portion of said sap-collecting section; said sleeve having a head section; said cooperating means including actuatable means on said sap-discharging section contacting said head section to slidably move said sleeve over said sap-collecting section.

3. A device as defined in claim 2, wherein said actuatable means consists of a lever pivotally mounted on said sap-discharging section.

4. A device as defined in claim 3, wherein said lever includes cam surface means contacting said head section and urging said sleeve to expand said sealing means when actuated.

5. A device as defined in claim 2, wherein said sealing means is a rubber band.

6. A device as defined in claim 1, wherein said sap-discharging section extends at an oblique angle relative to the longitudinal axis of said sap-collecting section.

7. A device as defined in claim 1, wherein said sap-collecting section includes a frusto-conical portion.

8. A device as defined in claim 7, wherein said frusto-conical portion displays, adjacent to the open end of said member, sap-irrigating means to allow sap in the outer layers to be received and directed to the open end and into said hollow member, said sap-irrigating means consist of longitudinal grooves circumferentially spaced at said open end of said first member.

9. A device as defined in claim 7, wherein said cooperating means consist of a first threaded section on said first member adjacent said frusto-conical portion and a second threaded section in said second member; said threaded sections engaging one another.

10. A device as defined in claim 9, further comprising means on said second member allowing rotation of said second member threadedly engaged to said first- member to slidably move said second member on said first member to expand said sealing means.

11. A device as defined in claim 9, wherein said second member is split longitudinally to allow said second body to be opened and positioned onto said first member.

12. A device as defined in claim 11 further comprising locking means on said second member for securing said second member onto said first member.

13. A device as defined in claim 12, wherein said locking means consist of a U-shaped extension adjacent one split-end of said second member and a T-shaped extension extending at the opposite split-end of said second member, the stem portion of the T-shaped extension being adapted to be engaged into the U-shaped member; means in said U-shaped member and on said stem portion for securing said extensions together when engaged into one another.

14. A device as defined in claim 9, wherein said sealing means is a rubber ring secured in said recess.

* * * * *